US012063490B2

(12) United States Patent
Kim et al.

(10) Patent No.: US 12,063,490 B2
(45) Date of Patent: Aug. 13, 2024

(54) ACTIVE SELF-VOICE NATURALIZATION USING A BONE CONDUCTION SENSOR

(71) Applicant: QUALCOMM Incorporated, San Diego, CA (US)

(72) Inventors: Lae-Hoon Kim, San Diego, CA (US); Rogerio Guedes Alves, Macomb Township, MI (US); Jacob Jon Bean, Vista, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/167,823

(22) Filed: Feb. 10, 2023

(65) Prior Publication Data

US 2023/0276173 A1 Aug. 31, 2023

Related U.S. Application Data

(63) Continuation of application No. 17/667,779, filed on Feb. 9, 2022, now Pat. No. 11,533,561, which is a continuation of application No. 17/530,320, filed on Nov. 18, 2021, now Pat. No. 11,606,643, which is a continuation of application No. 17/064,146, filed on Oct. 6, 2020, now Pat. No. 11,259,119.

(51) Int. Cl.
*H04R 3/04* (2006.01)

(52) U.S. Cl.
CPC ........... *H04R 3/04* (2013.01); *H04R 2460/13* (2013.01)

(58) Field of Classification Search
CPC .............................. H04R 3/04; H04R 2460/13
See application file for complete search history.

(56) References Cited

U.S. PATENT DOCUMENTS

| | | | |
|---|---|---|---|
| 10,681,452 | B1 | 6/2020 | Kim |
| 11,259,119 | B1 | 2/2022 | Kim et al. |
| 11,533,561 | B2 | 12/2022 | Kim et al. |
| 11,606,643 | B2 | 3/2023 | Kim et al. |
| 2007/0088544 | A1 | 4/2007 | Acero et al. |
| 2012/0278070 | A1 | 11/2012 | Herve et al. |

(Continued)

OTHER PUBLICATIONS

International Search Report and Written Opinion—PCT/US2021/053674—ISA/EPO—dated Jan. 20, 2022.

*Primary Examiner* — Andrew L Sniezek
(74) *Attorney, Agent, or Firm* — QUALCOMM Incorporated

(57) ABSTRACT

Methods, systems, and devices for signal processing are described. Generally, as provided for by the described techniques, a wearable device to receive an input audio signal from one or more outer microphones, an input audio signal from one or more inner microphones, and a bone conduction signal from a bone conduction sensor based on the input audio signals. The wearable device may filter the bone conduction signal based on a set of frequencies of the input audio signals, such as a low frequency portion of the input audio signals. For example, the wearable device may apply a filter to the bone conduction signal that accounts for an error in the input audio signals. The wearable device may add a gain to the filtered bone conduction signal and may equalize the filtered bone conduction signal based on the gain. The wearable device may output an audio signal to a speaker.

22 Claims, 10 Drawing Sheets

(56) References Cited

U.S. PATENT DOCUMENTS

| | | | | |
|---|---|---|---|---|
| 2017/0171679 | A1 | 6/2017 | Isberg et al. | |
| 2020/0020313 | A1 | 1/2020 | Hua et al. | |
| 2023/0105655 | A1* | 4/2023 | Kim ..................... | H04R 1/1083 381/71.1 |

* cited by examiner

ACTIVE SELF-VOICE NATURALIZATION USING A BONE CONDUCTION SENSOR

CROSS REFERENCE

The present Application for Patent is a Continuation of U.S. patent application Ser. No. 17/667,779 by KIM et al., entitled "ACTIVE SELF-VOICE NATURALIZATION USING A BONE CONDUCTION SENSOR" filed Feb. 9, 2022, which is a Continuation of U.S. patent application Ser. No. 17/530,320 by KIM et al., entitled "ACTIVE SELF-VOICE NATURALIZATION USING A BONE CONDUCTION SENSOR" filed Nov. 18, 2021, which is a Continuation of U.S. patent application Ser. No. 17/064,146 by KIM et al., entitled "ACTIVE SELF-VOICE NATURALIZATION USING A BONE CONDUCTION SENSOR," filed Oct. 6, 2020, assigned to the assignee hereof, and expressly incorporated by reference herein.

BACKGROUND

The following relates generally to signal processing, and more specifically to active self-voice naturalization (ASVN) using a bone conduction sensor.

A user may use a wearable device, and may wish to experience a listen-through feature, or self-voice naturalization. In some examples, when a user speaks (e.g., generates a self-voice signal), the user's voice may travel along two paths: an acoustic path and a bone conduction path. However, distortion patterns from external or background signals may be different than distortion patterns created by self-voice signals. Microphones picking up an input audio signal (e.g., including background noise and self-voice signals) may not seamlessly deal with the different types of signals. The different distortion patterns for different signals may result in a lack of natural sounding audio input when using a listen-through feature on the wearable device.

SUMMARY

The described techniques relate to improved methods, systems, devices, and apparatuses that support active self-voice naturalization (ASVN) using a bone conduction sensor. Generally, as provided for by the described techniques, a wearable device may include an outer microphone (e.g., outside the ear of a user), an inner microphone (e.g., inside the ear of the user), and the bone conduction sensor (e.g., inside the ear of the user), each of which may pick up external sound, such as self-voice, as an input. The hearing device may determine an error associated with the input to the bone conduction sensor based on a difference between the input to the outer microphone and the input to the inner microphone. The input to the bone conduction may be updated based on the error. The hearing device may perform an operation that applies a filter to the error updated input. Further, the outer microphone input may be equalized according to a gain. Both the error updated, filtered bone conduction sensor input and the equalized outer microphone input may be used to perform ASVN, which may allow the user to perceive both self-voice and additional external sound as natural.

A method of audio signal processing at a wearable device is described. The method may include receiving a first input audio signal from an outer microphone and a second input audio signal from an inner microphone at the wearable device including a set of microphones and a bone conduction sensor, receiving a bone conduction signal from the bone conduction sensor, the bone conduction signal associated with the first input audio signal and the second input audio signal, filtering the bone conduction signal based on a set of frequencies corresponding to the first input audio signal and the second input audio signal, and outputting, to a speaker of the wearable device, an output audio signal based on the filtering.

An apparatus for audio signal processing at a wearable device is described. The apparatus may include a processor, memory in electronic communication with the processor, and instructions stored in the memory. The instructions may be executable by the processor to cause the apparatus to receive a first input audio signal from an outer microphone and a second input audio signal from an inner microphone at the wearable device including a set of microphones and a bone conduction sensor, receive a bone conduction signal from the bone conduction sensor, the bone conduction signal associated with the first input audio signal and the second input audio signal, filter the bone conduction signal based on a set of frequencies corresponding to the first input audio signal and the second input audio signal, and output, to a speaker of the wearable device, an output audio signal based on the filtering.

Another apparatus for audio signal processing at a wearable device is described. The apparatus may include means for receiving a first input audio signal from an outer microphone and a second input audio signal from an inner microphone at the wearable device including a set of microphones and a bone conduction sensor, receiving a bone conduction signal from the bone conduction sensor, the bone conduction signal associated with the first input audio signal and the second input audio signal, filtering the bone conduction signal based on a set of frequencies corresponding to the first input audio signal and the second input audio signal, and outputting, to a speaker of the wearable device, an output audio signal based on the filtering.

A non-transitory computer-readable medium storing code for audio signal processing at a wearable device is described. The code may include instructions executable by a processor to receive a first input audio signal from an outer microphone and a second input audio signal from an inner microphone at the wearable device including a set of microphones and a bone conduction sensor, receive a bone conduction signal from the bone conduction sensor, the bone conduction signal associated with the first input audio signal and the second input audio signal, filter the bone conduction signal based on a set of frequencies corresponding to the first input audio signal and the second input audio signal, and output, to a speaker of the wearable device, an output audio signal based on the filtering.

Some examples of the method, apparatuses, and non-transitory computer-readable medium described herein may further include operations, features, means, or instructions for calculating a difference between the first input audio signal and the second input audio signal and determining an error based on the difference.

In some examples of the method, apparatuses, and non-transitory computer-readable medium described herein, filtering the bone conduction signal further may include operations, features, means, or instructions for adjusting the first input audio signal based on the error, adjusting the second input audio signal based on the error, and applying a filter to the adjusted first input audio signal, the adjusted second input audio signal, the bone conduction signal, or a combination.

Some examples of the method, apparatuses, and non-transitory computer-readable medium described herein may further include operations, features, means, or instructions for calculating one or more power ratios corresponding to the first input audio signal, the second input audio signal, the bone conduction signal, or a combination and determining a threshold power ratio for the one or more power ratios.

Some examples of the method, apparatuses, and non-transitory computer-readable medium described herein may further include operations, features, means, or instructions for adding a gain to the filtered bone conduction signal, the first input audio signal, the second input audio signal, or a combination based on the one or more power ratios being below the threshold power ratio.

Some examples of the method, apparatuses, and non-transitory computer-readable medium described herein may further include operations, features, means, or instructions for updating the gain based on filtering the bone conduction signal, wherein the gain is a tunable gain.

Some examples of the method, apparatuses, and non-transitory computer-readable medium described herein may further include operations, features, means, or instructions for equalizing the first input audio signal based on the gain and the second input audio signal.

Some examples of the method, apparatuses, and non-transitory computer-readable medium described herein may further include operations, features, means, or instructions for performing an active self-voice naturalization procedure based on the equalized first input audio signal and the filtered bone conduction signal.

In some examples of the method, apparatuses, and non-transitory computer-readable medium described herein, performing the active self-voice naturalization procedure further may include operations, features, means, or instructions for detecting a presence of self-voice in the first input audio signal.

In some examples of the method, apparatuses, and non-transitory computer-readable medium described herein, filtering the bone conduction signal further may include operations, features, means, or instructions for determining the first input audio signal and the second input audio signal include a set of frequencies and filtering one or more low frequencies corresponding to self-voice in the first input audio signal, the second input audio signal, or both, wherein the set of frequencies includes the one or more low frequencies.

DETAILED DESCRIPTION

Figure 1:
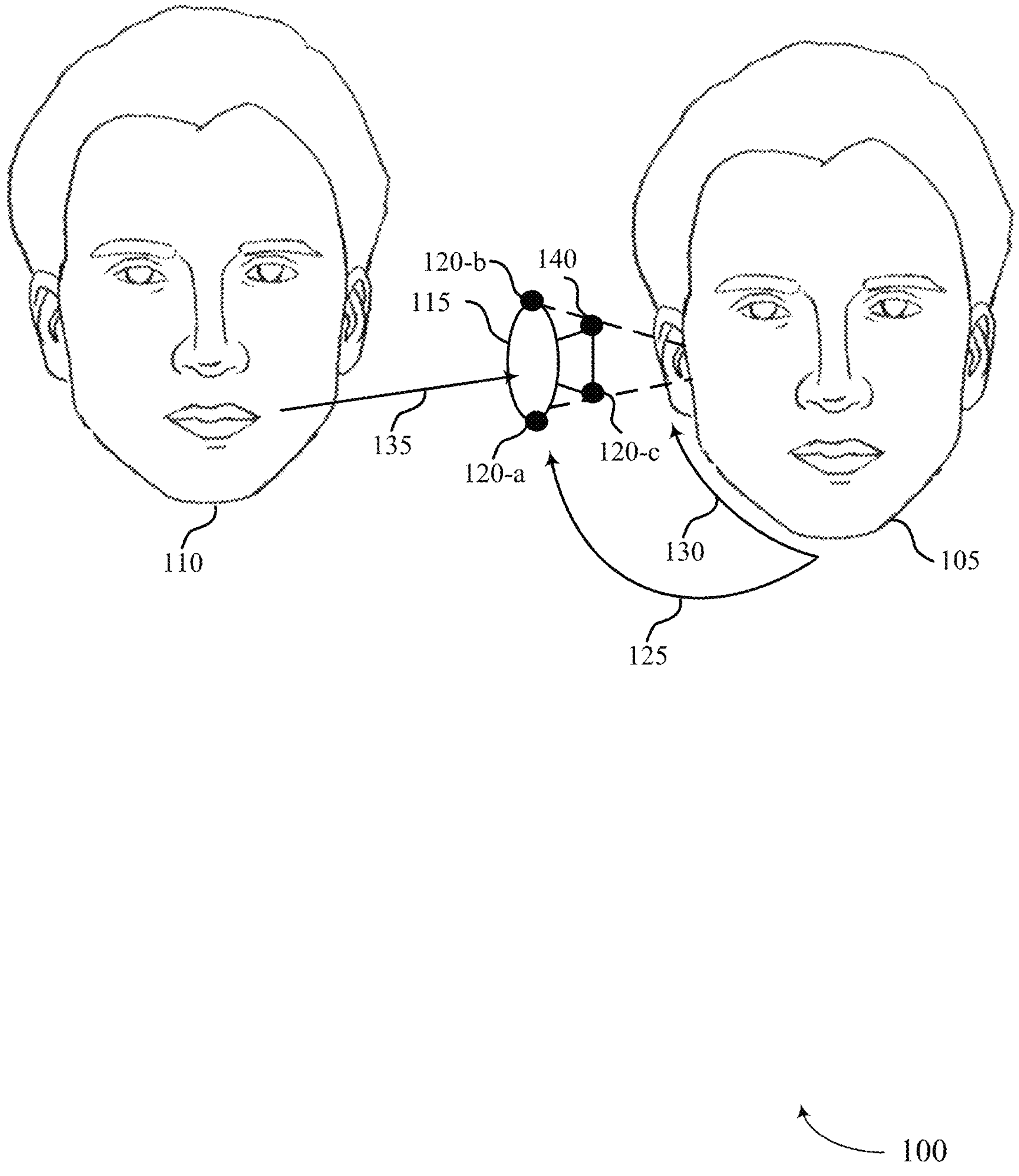
FIG. 1 illustrates an example of an audio signaling scenario that supports active self-voice naturalization (ASVN) using a bone conduction sensor in accordance with aspects of the present disclosure.

Some users may utilize a wearable device (e.g., a wireless communication device, wireless headset, earbud, speaker, hearing assistance device, or the like), and may wear the device to make use of it in a hands-free manner. Some wearable devices may include multiple microphones attached on the outside and inside of the device. These microphones may be used for multiple purposes, such as noise detection, audio signal output, active noise cancellation, and the like. When the user (e.g., wearer) of the wearable device speaks, they may generate a unique audio signal (e.g., self-voice). For example, the user's self-voice signal may travel along an acoustic path (e.g., from the user's mouth to the microphones of the headset) and along a second sound path created by vibrations via bone conduction between the user's mouth and the microphones of the headset.

Some hearing devices, such as hearing aids or headsets, may operate in a mode that allows a user to hear external sounds. This mode may be referred to as a transparent mode. For example, a user may activate a transparent mode to determine how loud to speak when communicating using a headset. In some cases, the voice of the user (e.g., the self-voice) may sound different to the user without a hearing device than with the hearing device, even when the hearing device is in a transparent mode. This difference may result from a change in acoustic paths from the hearing device (e.g., a lack of a bone conduction acoustic path) as well as an imbalanced representation of frequencies in the frequency range of the self-voice in the transparent mode (e.g., an increased representation of low frequencies).

As described herein, a wearable device may include a bone conduction sensor to normalize a set of frequencies for a voice of a user. In some cases, the hearing device may include an outer microphone (e.g., outside the ear of the user), an inner microphone (e.g., inside the ear of the user), and the bone conduction sensor (e.g., inside the ear of the user), each of which may pick up external sound, such as self-voice, as an input. The hearing device may determine an error associated with the input to the bone conduction sensor based on a difference between the input to the outer microphone and the input to the inner microphone. The input to the bone conduction may be updated based on the error and may be filtered (e.g., to suppress an overrepresented low frequency portion of the self-voice). Further, the outer microphone input may be equalized according to a gain. Both the updated, filtered bone conduction sensor input and the equalized outer microphone input may be used to perform active self-voice naturalization (ASVN), which may allow the user to perceive both self-voice and additional external sound as natural.

Aspects of the disclosure are initially described in the context of a signal processing system. Aspects of the disclosure are further illustrated by and described with reference to signal processing schemes. Aspects of the disclosure are further illustrated by and described with reference to apparatus diagrams, system diagrams, and flowcharts that relate to ASVN using a bone conduction sensor.

FIG. 1 illustrates an example of an audio signaling scenario 100 that supports ASVN using a bone conduction sensor in accordance with aspects of the present disclosure. Audio signaling scenario 100 may occur when a user 105 using a wearable device 115 desires to experience a listen-through feature.

A user 105 may use a wearable device 115 (e.g., a wireless communication device, wireless headset, ear-bud, speaker, hearing assistance device, or the like), which may be worn by the user 105 in a hands-free manner. In some cases, the wearable device 115 may also be referred to as a hearing device. In some examples, the user 105 may continuously wear the wearable device 115, whether the wearable device 115 is currently in use (e.g., inputting an audio signal, outputting an audio signal, or both at one or more microphones 120) or not. In some examples, the wearable device 115 may include multiple microphones 120. For instance, the wearable device 115 may include one or more outer microphones 120, such as outer microphone 120-*a* and outer microphone 120-*b*. Wearable device 115 may also include one or more inner microphones 120, such as inner microphone 120-*c*. The wearable device 115 may use the microphones 120 for noise detection, audio signal output, active noise cancellation, and the like.

When the user 105 speaks, the user 105 may generate a unique audio signal (e.g., self-voice). For example, the user 105 may generate a self-voice signal that may travel along an acoustic path 125 (e.g., from the mouth of user 105 to the microphones 120 of the headset). The user 105 may also generate a self-voice signal that may follow a sound conduction path 130 created by vibrations via bone conduction between the vocal cords or mouth of the user 105 and the microphones 120 of the wearable device 115. In some examples, the wearable device 115 may perform self-voice activity detection (SVAD) based on the self-voice qualities. For instance, the wearable device 115 may identify inter channel phase and intensity differences (e.g., interaction between the outer microphones 120 and the inner microphones 120 of the wearable device 115). The wearable device 115 may use the detected differences as qualifying features to contrast self-speech signals and external signals. For example, if one or more differences between channel phase and intensity between inner microphone 120-*c* and outer microphone 120-*a* are detected or if one or more differences between channel phase and intensity between inner microphone 120-*c* and outer microphone 120-*a* satisfy a threshold value, then the wearable device 115 may determine that a self-voice signal is present in an input audio signal.

In some examples, the wearable device 115 may provide a listen-through feature for operating in a transparent mode. A listen-through feature may allow the user 105 to hear an output audio signal from the wearable device 115 as if the wearable device 115 were not present. The listen-through feature may allow the user 105 to wear the wearable device 115 in a hands-free manner regardless of the current use-case of the wearable device 115 (e.g., regardless of whether the wearable device 115 is outputting an audio signal, inputting an audio signal, or both using one or more microphones 120). For example, an audio source 110 (e.g., a person, audio from the surrounding environment, or the like) may generate an external audio signal 135. For example, a person may speak to the user 105, creating external audio signal 135. Without a listen-through feature, the external audio signal 135 may be blocked, muffled, or otherwise distorted by the wearable device 115. A listen-through feature may utilize outer microphone 120-*a*, outer microphone 120-*b*, inner microphone 120-*c*, or a combination to receive an input audio signal (e.g., external audio signal 135), process the input audio signal, and output an audio signal (e.g., via inner microphone 120-*c*) that sounds natural to the user 105 (e.g., sounds as if the user 105 were not wearing a device).

A self-voice audio signal following acoustic path 125 and the external audio signal 135 may have different distortion patterns. For instance, the external audio signal 135, self-voice audio signal following acoustic path 125, or both may have a first distortion pattern. But self-voice following sound conduction path 130, self-voice following acoustic path 125, or both may have a second distortion pattern. The microphones 120 of the wearable device 115 may detect the self-voice audio signal and the external audio signal 135 similarly. Thus, without different treatments for the different signal types, a user 105 may not experience a natural sounding input audio signal. That is, wearable device 115 may detect an input audio signal including a combination of external audio signal 135, self-voice via acoustic path 125, or self-voice via sound conduction path 130. Wearable device 115 may detect the input audio signal using the microphones 120.

In some examples, the wearable device 115 may detect the external audio signal 135 and the self-voice via acoustic path 125 with outer microphone 120-*a* and outer microphone 120-*b*. Additionally or alternatively, the wearable device 115 may detect the self-voice via sound conduction path 130 with one or more inner microphones 120, such as inner microphone 120-*c*. The wearable device 115 may perform a filtering procedure for the received signals and may generate an output audio signal for the user 105 (e.g., via inner microphone 120-*c*). In some cases, it may be difficult for the wearable device 115 to produce a natural sounding self-voice without modifying the external sound perception (e.g., due to different distortion patterns). For example, the wearable device 115 may be unable to suppress a boost of the low frequency range of self-voice, may lose the high frequency range of self-voice, or both after performing active noise cancellation techniques to suppress a low frequency build up.

In some examples, the wearable device 115 may use a signal from a bone conduction sensor 140 to modify the frequencies of an external audio signal 135 and self-voice to achieve natural sounding output audio signals while the wearable device 115 is operating in a transparent mode. For example, the bone conduction sensor 140 may allow the wearable device to suppress a self-voice low frequency build up, such that an equalization operation for the input audio signal may be applied to a high frequency portion regardless of whether self-voice is present. That is, the self-voice naturalization may be decoupled from a transparency mode (e.g., a listen-through feature) at the wearable device 115.

In some cases, a user 105 may experience bone conduction when speaking using wearable device 115. For example, bone conduction may be the conduction of sound to the inner ear through the bones of the skull, which may allow the user 105 to perceive audio content using vibrations in the bone. In some examples, bone may convey lower-frequency sounds better than higher-frequency sound. The bone conduction sensor 140 may include a transducer that outputs a signal based on the vibrations of the bone due to audio. Additionally or alternatively, the bone conduction sensor 140 may include any device (e.g., a sensor, or the like) that detects a vibration and outputs an electronic signal.

In some examples, the wearable device 115 may receive an input audio signal from outer microphone 120-*a*, outer microphone 120-*b*, or both (e.g., an external audio signal 135, the self-voice of the user 105, or both) and an input audio signal from an inner microphone 120-*c*. Additionally, the wearable device 115 may receive a bone conduction signal from the bone conduction sensor 140 based on the input audio signals. The wearable device 115 may filter the bone conduction signal based on a set of frequencies of the input audio signals, such as a low frequency portion of the input audio signals. For example, the wearable device 115 may apply a filter to the bone conduction signal that accounts for an error, which may be the difference between the input audio signal from one or more outer microphones 120 and one or more inner microphones 120. In some cases, the wearable device 115 may add a gain to the filtered bone conduction signal and may equalize the filtered bone conduction signal based on the gain, which is described in further detail with respect to FIGS. 2 and 3. The wearable device 115 may output an audio signal (e.g., the filtered bone conduction signal) to a speaker the user 105 can hear.

Figure 2:
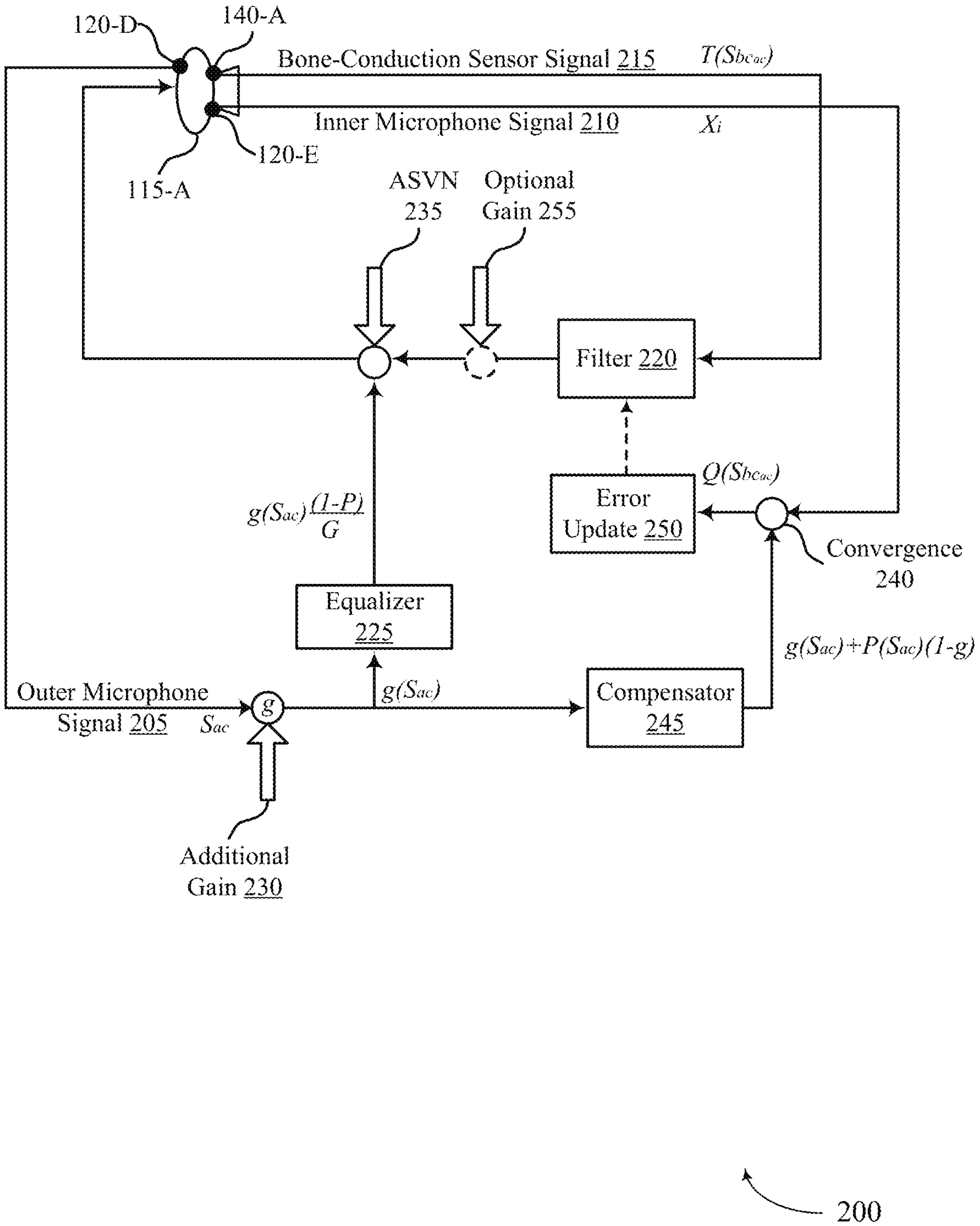
FIGS. 2 and 3 illustrate examples of signal processing schemes that support ASVN using a bone conduction sensor in accordance with aspects of the present disclosure.

FIG. 2 illustrates an example of a signal processing scheme 200 that supports ASVN using a bone conduction sensor in accordance with aspects of the present disclosure. In some examples, signal processing scheme 200 may implement aspects of audio signaling scenario 100 and may include wearable device 115-*a* with outer microphone 120-*d*, inner microphone 120-*e*, and bone conduction sensor 140-*a*, which may be examples of a wearable device 115, microphones 120, and a bone conduction sensor 140 as described with reference to FIG. 1. For example, wearable device 115-*a*, which may be a hearing device, may apply a listen-through feature in a transparent mode using bone conduction sensor 140-*a* to account for self-voice.

In some cases, a wearable device 115 may be operating in a transparent mode in which a user 105 may hear external noise. The wearable device 115 may detect an input audio signal from one or more outer microphones 120, an input audio signal from one or more inner microphones, or both. For example, wearable device 115-*a* may detect outer microphone signal 205 using outer microphone 120-*d*, inner microphone signal 210 using inner microphone 120-*e*, or both. Outer microphone signal 205 and inner microphone signal 210 may include an audio signal from an external source, self-voice, or both. A self-voice audio signal and an external audio signal may have different distortion patterns. The wearable device 115 may perform a filtering procedure for the input audio signals and may generate an output audio signal for the user 105. In some cases, it may be difficult for the wearable device 115 to produce a natural sounding self-voice without modifying the external sound perception (e.g., due to the different distortion patterns). For example, the wearable device 115 may be unable to suppress a boost of the low frequency range of self-voice, may lose the high frequency range of self-voice, or both after performing active noise cancellation techniques to suppress a low frequency build up.

In some cases, a wearable device 115 may use a bone conduction sensor 140 to achieve a true transparent mode. For example, wearable device 115-*a* may detect a bone conduction sensor signal 215 from bone conduction sensor 140-*a*. Wearable device 115-*a* may perform one or more operations on the outer microphone signal 205, the inner microphone signal 210, the bone conduction sensor signal 215, or a combination to output an audio signal to a speaker of wearable device 115-*a*. For example, without a headset, a user 105 may hear an audio signal according to Equation 1:

$$S_{ac}+S_{bc_{ac}}+S_{bc_{bc}}\cong S_{ac}+S_{bc_{bc}}$$

where $S_{ac}$ may be the audio signal that travels along a pure acoustic path, $$S_{bc_{ac}}$$

may be the audio signal that travels along an acoustic path from bone conduction, and $$S_{bc_{bc}}$$

is the audio signal that travels along a bone conduction path. In some other examples, with a headset, the user 105 may hear an audio signal according to equation 2:

$$P\times S_{ac}+Q\times S_{bc_{ac}}+S_{bc_{bc}}$$

where P is a passive attenuation factor and Q is a boosted bone conduction factor. In some cases, the audio signal that travels along the bone conduction path may not be captured with a microphone 120, however may be perceptible by the user 105. Thus, the wearable device 115 may apply a filter 220 to the bone conduction sensor signal 215, based on one or more operations and frequencies of the outer microphone signal 205 and the inner microphone signal 210 to account for the passive attenuation and the boosted bone conduction factors.

The outer microphone signal 205 may be the audio signal that travels along a pure acoustic path, $S_{ac}$. The wearable device 115 may apply an equalizer 225 to make up the loss (e.g., passive attenuation, P) due to passive gain between the outer microphone 120-*d* and the inner microphone 120-*e* and to compensate for speaker distortion, G. For example, the equalizer 225 may multiply an input to the equalizer 225, which may be $S_{ac}$ or $S_{ac}$ with an additional gain 230, $g(S_{ac})$, by $$\frac{(1-P)}{G}.$$

In some cases, wearable device 115-*a* may shape the additional gain, g, per frequency for a pattern based on user preferences. In some cases, wearable device 115-*a* may maintain a "closed headset" status for external sound, then may apply the equalizer during the ASVN procedure at 235.

In some examples, at convergence 240, wearable device 115-*a* may combine outer microphone signal 205, which may include additional gain 230, may have been operated on by a compensator 245, or both, with an inner microphone signal 210 to avoid cancelling a portion of additional playback (e.g., which may occur during the equalization operation). In some cases, wearable device 115-*a* may apply the compensator 245 to the outer microphone signal 205, or modified outer microphone signal 205 (e.g., to $S_{ac}$ or $S_{ac}$ with an additional gain 230, $g(S_{ac})$). In some cases, the compensator may account for noise in the bone conduction sensor signal 215 by accounting for $$1+P\frac{(1-g)}{g}.$$

Wearable device 115-*a* may perform a pre-processing step to the outer microphone signal 205, the bone conduction sensor signal 215, or both.

For example, wearable device 115-*a* may check the power-ratio between signals from the bone conduction sensor 140-*a* and outer microphone 120-*d*. Wearable device 115-*a* may suppress a portion of the outer microphone signal 205, the bone conduction sensor signal 215, or both with a power-ratio below a threshold value, which may suppress external sound captured by the bone conduction sensor 140-*a*. Additionally or alternatively, wearable device 115-*a* may measure the cross-correlation between the outer microphone signal 205 and the bone conduction sensor signal 215 or between the bone conduction sensor signal 215 and the inner microphone signal 210. Wearable device 115-*a* may suppress an uncorrelated portion of the signals (e.g., the outer microphone signal 205, the bone conduction sensor signal 215, the inner microphone signal 210, or a combination), which may suppress uncorrelated noise in the signals.

In some cases, after convergence 240, wearable device 115-*a* may perform an error update procedure 250 to a boosted bone conduction inner microphone signal 210, $$Q(S_{bc_{ac}}).$$

For example, the error update procedure may input $$QAA(S_{bc_{ac}})$$

as the variable Z in Equation 4:

$$\|S_{ac}-X_i(Z)\|^2$$

where $X_i$ is the inner microphone signal 210.

In some examples, wearable device 115-*a* may apply a filter 220 to the error updated inner microphone signal 210, the bone conduction sensor signal 215, or both. In some examples, wearable device 115-*a* may interpret the bone conduction sensor signal 215 as distorted by a factor T (e.g., as $$T(S_{bc_{ac}})).$$

The filter 220 may be a finite impulse response (FIR) filter, an infinite impulse response (IIR) filter, or any other type of filter. In some examples, the filter 220 may multiply the input (e.g., the error updated inner microphone signal 210, the bone conduction sensor signal 215, or both) by a factor, such as $$\frac{Q}{TG},$$

which may account for the distortion of the bone conduction sensor signal 215, T, the speaker distortion, G, and boosted bone conduction factor, Q. In some cases, wearable device 115-*a* may filter one or more low frequencies of the self-voice based on applying the filter 220 to the error updated inner microphone signal 210, the bone conduction sensor signal 215, or both.

After applying filter 220 to the error updated inner microphone signal 210, the bone conduction sensor signal 215, or both, wearable device 115-*a* may add optional gain 255 to the output of the filter 220. For example, wearable device 115-*a* may add the optional gain 255 to have a small residual of the acoustically transmitted bone conduction sound, $$S_{bc_{ac}}.$$

The user 105 may hear the slight residual of $$S_{bc_{ac}},$$

which may be accounted for in the ASVN procedure 235 if wearable device 115-*a* adds the optional gain 255. In some cases, optional gain 255 may be a tunable gain, which wearable device 115-*a* may adjust. Wearable device 115-*a* may perform an ASVN procedure based on the equalized outer microphone signal 205 and the filtered bone conduction sensor signal 215.

Figure 3:
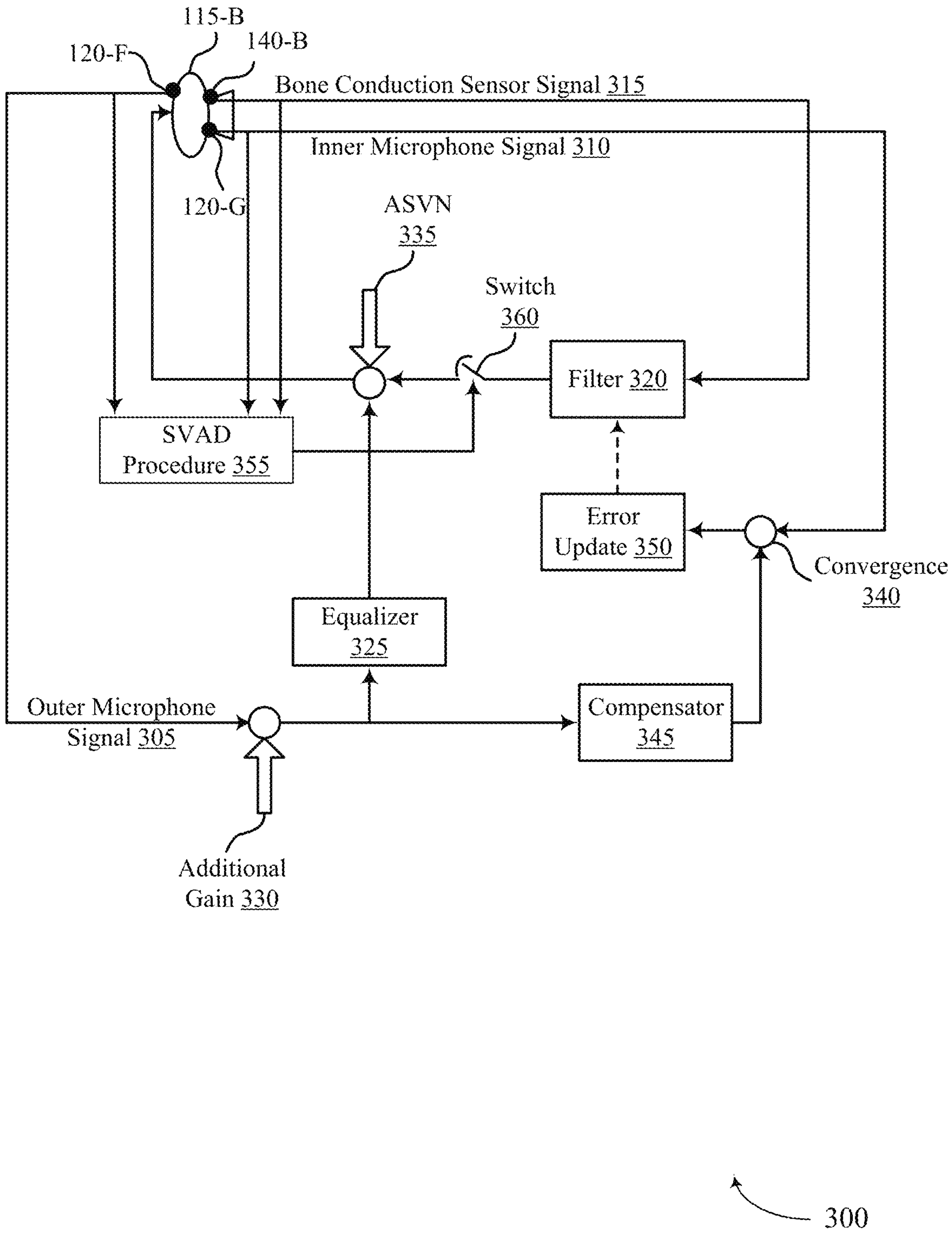

FIG. 3 illustrates an example of a signal processing scheme 300 that supports ASVN using a bone conduction sensor in accordance with aspects of the present disclosure. In some examples, the signal processing scheme 300 may implement aspects of audio signaling scenario 100, signal processing scheme 200, or both. The signal processing scheme 300 and may include wearable device 115-*b* with outer microphone 120-*f* and outer microphone signal 305, inner microphone 120-*g* with inner microphone signal 310, and bone conduction sensor 140-*b* with bone conduction sensor signal 315, which may be examples of a wearable device 115, microphones 120, and a bone conduction sensor 140 as described with reference to FIG. 1 and an outer microphone signal 205, an inner microphone signal 210, and a bone conduction sensor signal 215 as described with reference to FIG. 2. The signal processing scheme 300 may also include one or more operations involving a filter 320, an equalizer 325, additional gain 330, an ASVN procedure 335, the convergence of one or more signals 340, a compensator 345, an error update procedure 350, or the like as described with reference to FIG. 2. For example, wearable device 115-*b* may apply a filter 320 to an error updated outer microphone signal 305 (e.g., based on an inner microphone signal 310), a bone conduction sensor signal 315, or both to account for self-voice for a listen-through feature in a transparent mode.

In some cases, wearable device 115-*b* may be operating in a transparent mode in which a user 105 may hear external noise. Wearable device 115-*b* may detect outer microphone signal 305 using outer microphone 120-*f*, inner microphone signal 310 using inner microphone 120-*g*, or both. Outer microphone signal 305 and inner microphone signal 310 may include an audio signal from an external source, self-voice, or both. A self-voice audio signal and an external audio signal may have different distortion patterns. In some cases, it may be difficult for wearable device 115-*b* to produce a natural sounding self-voice without modifying the external sound perception (e.g., due to the different distortion patterns). For example, wearable device 115-*b* may be unable to suppress a boost of the low frequency range of self-voice, may lose the high frequency range of self-voice, or both after performing active noise cancellation techniques to suppress a low frequency build up.

In some examples, wearable device 115-*b* may determine whether there is self-voice present in the external audio signal prior to performing one or more operations to modify the outer microphone signal 305, the bone conduction sensor signal 315, or both to account for the self-voice (e.g., modify the signals as described with reference to FIG. 2). Wearable device 115-*b* may perform a SVAD procedure 355 based on detecting one or more self-voice qualities. For example, wearable device 115-*b* may identify inter channel phase and intensity differences (e.g., interaction between outer microphone 120-*f* and inner microphone 120-*g*). Wearable device 115-*b* may use the detected differences as qualifying features to contrast self-speech signals and external signals. For example, if one or more differences between channel phase and intensity between inner microphone 120-*g* and outer microphone 120-*f* are detected or if one or more differences between channel phase and intensity between inner microphone 120-*g* and outer microphone 120-*f* satisfy a threshold value, then wearable device 115-*b* may determine that a self-voice signal is present in an input audio signal.

In some cases, wearable device 115-*b* may turn switch 360 on when wearable device 115-*b* detects self-voice during the SVAD procedure 355. When the switch 360 is on, wearable device 115-*b* may perform the ASVN procedure 335 using the filtered bone conduction sensor signal 315, the equalized outer microphone signal 305, or both (e.g., as described in signal processing scheme 200 with reference to FIG. 2). In some other cases, wearable device 115-*b* may turn switch 360 off when wearable device 115-*b* does not detect self-voice during the SVAD procedure 355. When the switch 360 is off, wearable device 115-*b* may not perform the ASVN procedure 335, and may instead output the outer microphone signal 305, the inner microphone signal 310, or both without accounting for the bone conduction (e.g., without using bone conduction sensor 140-*b*).

Figure 4:
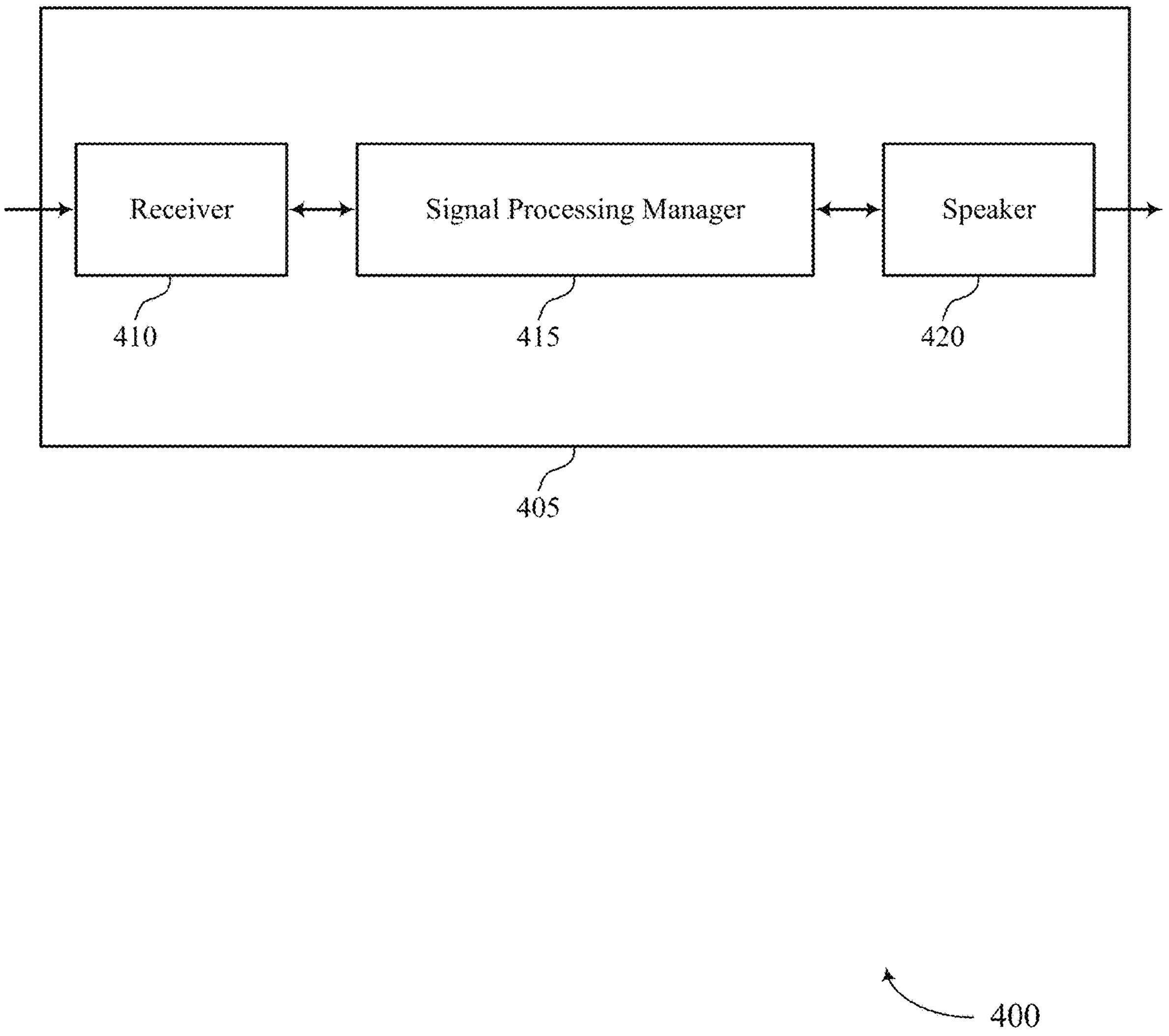
FIGS. 4 and 5 show block diagrams of wearable devices that support ASVN using a bone conduction sensor in accordance with aspects of the present disclosure.

FIG. 4 shows a block diagram 400 of a wearable device 405 that supports ASVN using a bone conduction sensor in accordance with aspects of the present disclosure. The wearable device 405 may be an example of aspects of a wearable device 115 as described herein. The wearable device 405 may include a receiver 410, a signal processing manager 415, and a speaker 420. The wearable device 405 may also include a processor. Each of these components may be in communication with one another (e.g., via one or more buses).

The receiver 410 may receive audio signals from a surrounding area (e.g., via an array of microphones). Detected audio signals may be passed on to other components of the wearable device 405. The receiver 410 may utilize a single antenna or a set of antennas to communicate with other devices while providing seamless listen-through features.

The signal processing manager 415 may receive, at the wearable device including a set of microphones and a bone conduction sensor, a first input audio signal from an outer microphone and a second input audio signal from an inner microphone, receive a bone conduction signal from the bone conduction sensor, the bone conduction signal associated with the first input audio signal and the second input audio signal, filter the bone conduction signal based at least in part on a set of frequencies corresponding to the first input audio signal and the second input audio signal, and output, to a speaker of the wearable device, an output audio signal based on the filtering. The signal processing manager 415 may be an example of aspects of the signal processing manager 710 described herein.

The actions performed by the signal processing manager 415 as described herein may be implemented to realize one or more potential advantages. One implementation may enable a wearable device to use a signal output of a bone conduction sensor to account for self-voice in an audio signal. The bone conduction sensor may enable a wearable device to filter one or more audio signals and the bone conduction sensor signal in a transparent mode, which may allow for a natural sounding self-voice as an output of the wearable device, among other advantages.

Based on implementing the bone conduction sensor as described herein, a processor of a wearable device (e.g., a processor controlling the receiver 410, the signal processing manager 415, the speaker 420, or a combination thereof) may improve user experience when operating in a transparent mode while ensuring relatively efficient operations. For example, the ASVN techniques described herein may leverage a filter and equalization operation for a microphone signal, a bone conduction sensor signal, or both based on detecting self-voice in an external audio signal, which may realize improved transparent mode operations at the wearable device, among other benefits.

The signal processing manager 415, or its sub-components, may be implemented in hardware, code (e.g., software or firmware) executed by a processor, or any combination thereof. If implemented in code executed by a processor, the functions of the signal processing manager 415, or its sub-components may be executed by a general-purpose processor, a digital signal processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The signal processing manager 415, or its sub-components, may be physically located at various positions, including being distributed such that portions of functions are implemented at different physical locations by one or more physical components. In some examples, the signal processing manager 415, or its sub-components, may be a separate and distinct component in accordance with various aspects of the present disclosure. In some examples, signal processing manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The speaker 420 may provide output signals generated by other components of the wearable device 405. In some examples, the speaker 420 may be collocated with an inner microphone of wearable device 405. For example, the speaker 420 may be an example of aspects of the speaker 725 described with reference to FIG. 7.

Figure 5:
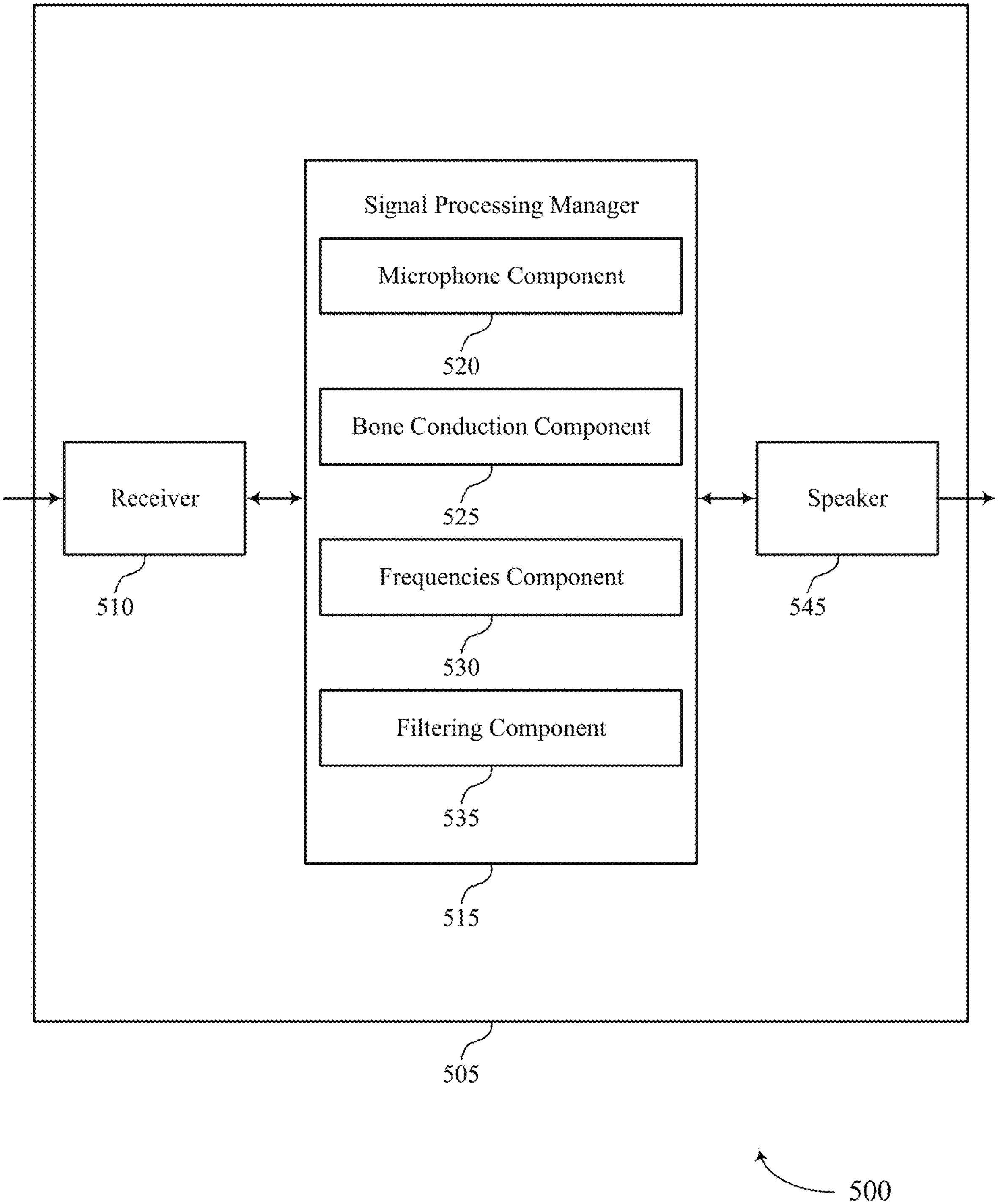

FIG. 5 shows a block diagram 500 of a wearable device 505 that supports ASVN using a bone conduction sensor in accordance with aspects of the present disclosure. The wearable device 505 may be an example of aspects of a wearable device 405 or a wearable device 115 as described herein. The wearable device 505 may include a receiver 510, a signal processing manager 515, and a speaker 545. The wearable device 505 may also include a processor. Each of these components may be in communication with one another (e.g., via one or more buses).

The receiver 510 may receive audio signals (e.g., via a set of microphones). Information may be passed on to other components of the wearable device 505.

The signal processing manager 515 may be an example of aspects of the signal processing manager 415, the signal processing manager 605, or the signal processing manager 710, as described herein. The signal processing manager 515 may include a microphone component 520, a bone conduction component 525, a frequencies component 530, and an output component 535.

The microphone component 520 may receive, at the wearable device including a set of microphones and a bone conduction sensor, a first input audio signal from an outer microphone and a second input audio signal from an inner microphone. The bone conduction component 525 may receive a bone conduction signal from the bone conduction sensor, the bone conduction signal associated with the first input audio signal and the second input audio signal. The frequencies component 530 may filter the bone conduction signal based on a set of frequencies corresponding to the first input audio signal and the second input audio signal. The output component 535 may output, to a speaker of the wearable device, an output audio signal based at least in part on the filtering.

The speaker 545 may provide output signals generated by other components of the wearable device 505. In some examples, the speaker 545 may be collocated with a microphone. For example, speaker 545 may be an example of aspects of the speaker 725 described with reference to FIG. 7.

Figure 6:
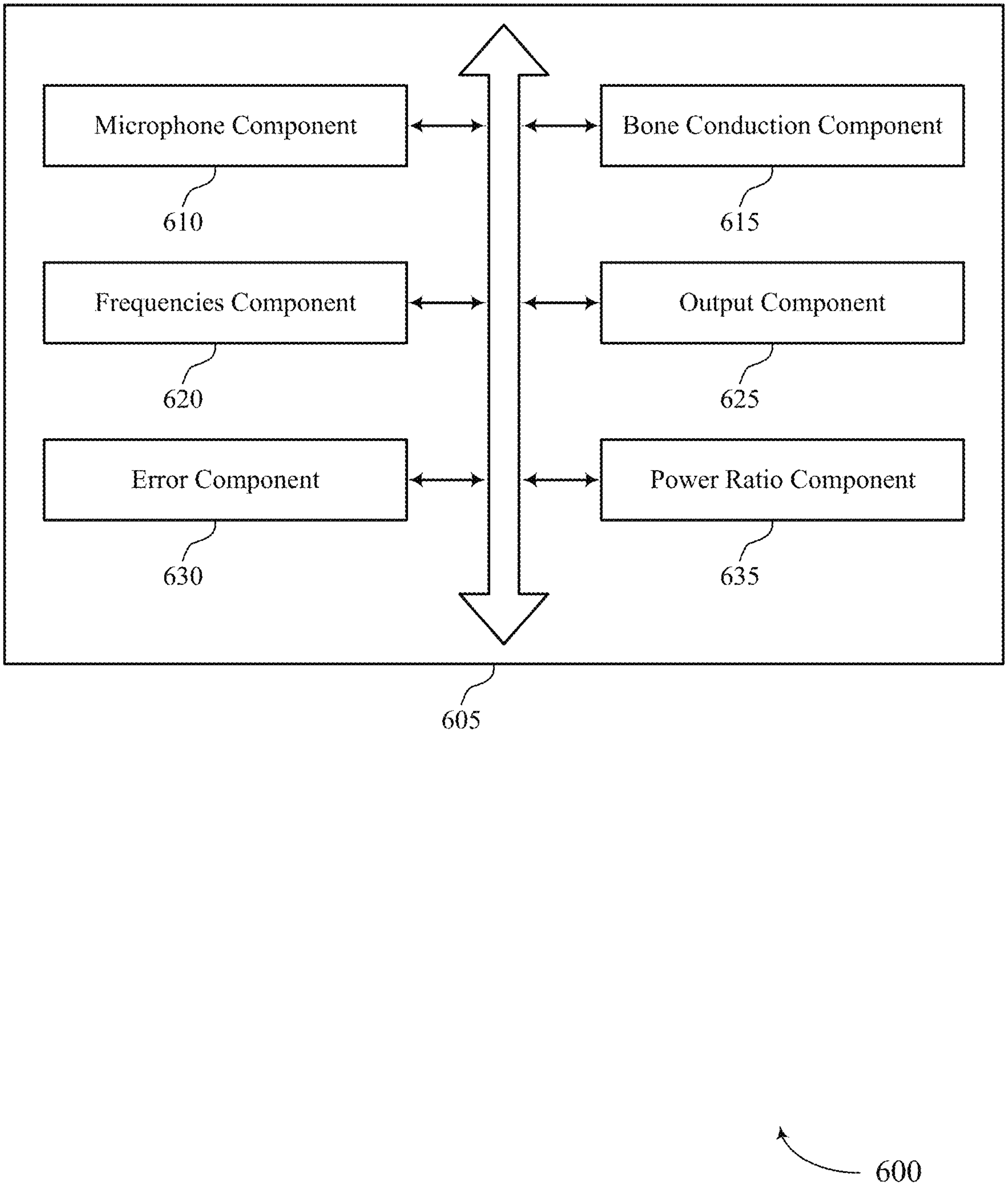
FIG. 6 shows a block diagram of a signal processing manager that supports ASVN using a bone conduction sensor in accordance with aspects of the present disclosure.

FIG. 6 shows a block diagram 600 of a signal processing manager 605 that supports ASVN using a bone conduction sensor in accordance with aspects of the present disclosure. The signal processing manager 605 may be an example of aspects of a signal processing manager 415, a signal processing manager 515, or a signal processing manager 710 described herein. The signal processing manager 605 may include a microphone component 610, a bone conduction component 615, a frequencies component 620, an output component 625, an error component 630, and a power ratio component 635. Each of these modules may communicate, directly or indirectly, with one another (e.g., via one or more buses).

The microphone component 610 may receive, at the wearable device including a set of microphones and a bone conduction sensor, a first input audio signal from an outer microphone and a second input audio signal from an inner microphone. The bone conduction component 615 may receive a bone conduction signal from the bone conduction sensor, the bone conduction signal associated with the first input audio signal and the second input audio signal. The frequencies component 620 may filter the bone conduction signal based on a set of frequencies corresponding to the first input audio signal and the second input audio signal, as described herein. The output component 625 may output, to a speaker of the wearable device, an output audio signal based at least in part on the filtering.

In some examples, the error component 630 may calculate a difference between the first input audio signal and the second input audio signal and determine an error based on the difference. The error component 630 may adjust the first input audio signal on the error, adjust the second input audio signal based on the error, and apply a filter to the adjusted first input audio signal, the adjusted second input audio signal, the bone conduction signal, or a combination.

In some cases, the power ratio component 635 may calculate one or more power ratios corresponding to the first input audio signal, the second input audio signal, the bone conduction signal, or a combination and may determine a threshold power ratio for the one or more power ratios. The power ratio component 635 may add a gain to the filtered bone conduction signal, the first input audio signal, the second input audio signal, or a combination based on the one or more power ratios being below the threshold power ratio. The power ratio component 635 may update the gain based on filtering the bone conduction signal, where the gain is a tunable gain. In some examples, the power ratio component 635 may equalize the first input audio signal based on the gain and the second input audio signal. The power ratio component 635 may perform an ASVN procedure based on the equalized first input audio signal and the filtered bone conduction signal. For example, the power ratio component 635 may detect a presence of self-voice in the first input audio signal.

In some cases, the frequencies component 620 may determine the first input audio signal and the second input audio signal include a set of frequencies and filter one or more low frequencies corresponding to self-voice in the first input audio signal, the second input audio signal, or both, where the set of frequencies comprises the one or more low frequencies.

Figure 7:
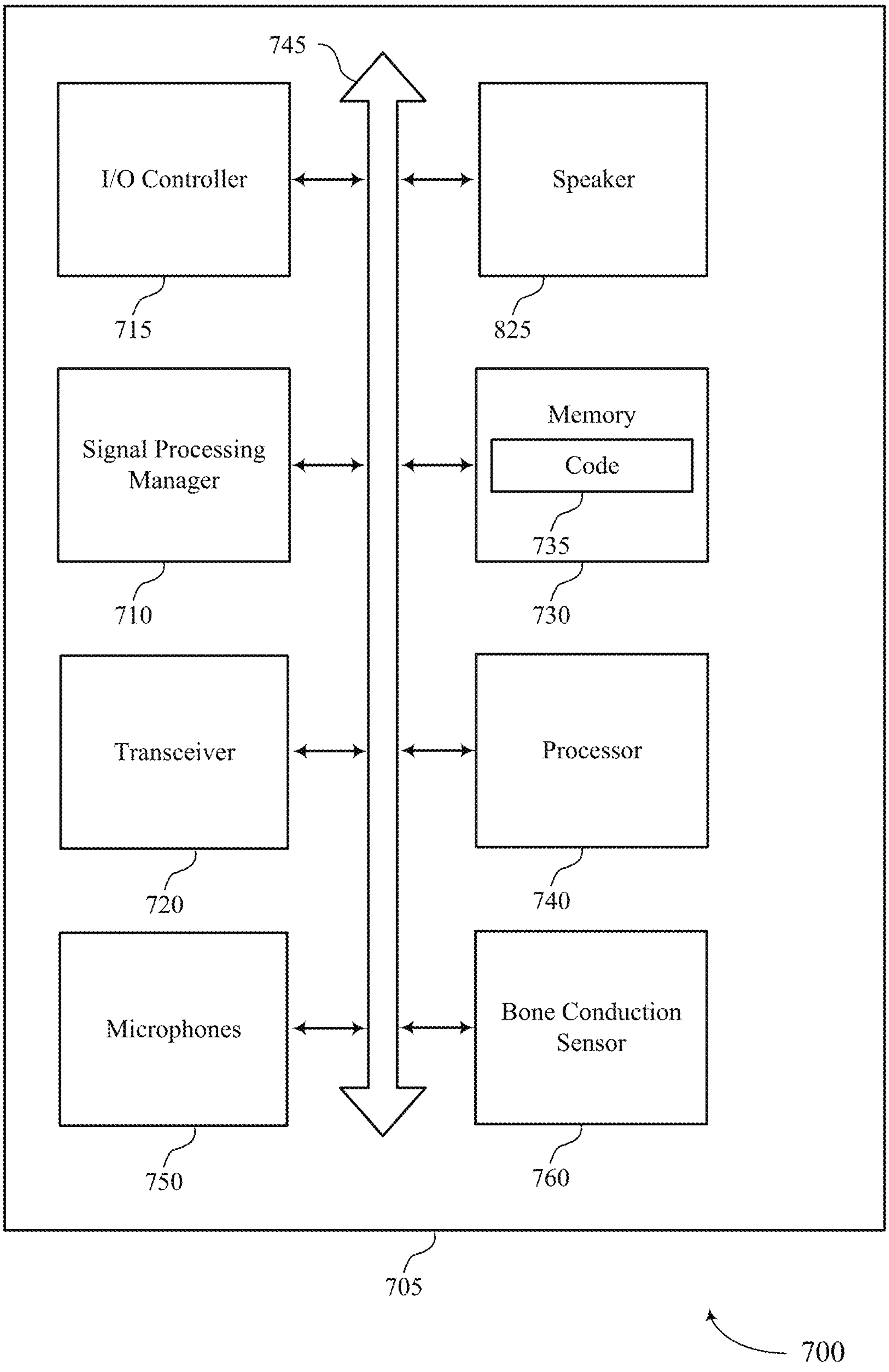
FIG. 7 shows a diagram of a system including a wearable device that supports ASVN using a bone conduction sensor in accordance with aspects of the present disclosure.

FIG. 7 shows a diagram of a system 700 including a wearable device 705 that supports ASVN using a bone conduction sensor in accordance with aspects of the present disclosure. The wearable device 705 may be an example of or include the components of wearable device 115, wearable device 405, or wearable device 505 as described herein. The wearable device 705 may include components for bi-directional voice and data communications including components for transmitting and receiving communications, including a signal processing manager 710, an I/O controller 715, a transceiver 720, memory 730, and a processor 740. These components may be in electronic communication via one or more buses (e.g., bus 745).

The signal processing manager 710 may receive, at the wearable device including a set of microphones 750 and a bone conduction sensor 760, a first input audio signal from an outer microphone and a second input audio signal from an inner microphone, receive a bone conduction signal from the bone conduction sensor, the bone conduction signal associated with the first input audio signal and the second input audio signal, filter the bone conduction signal based at least in part on a set of frequencies corresponding to the first input audio signal and the second input audio signal, and output, to a speaker of the wearable device, an output audio signal based on the filtering.

The I/O controller 715 may manage input and output signals for the wearable device 705. The I/O controller 715 may also manage peripherals not integrated into the wearable device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the wearable device 705 via the I/O controller 715 or via hardware components controlled by the I/O controller 715.

The transceiver 720 may communicate bi-directionally, via one or more antennas, wired, or wireless links. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some examples, the listen-through features described above may allow a user to experience natural sounding interactions with an environment while performing wireless communications or receiving data via transceiver 720.

The speaker 725 may provide an output audio signal to a user (e.g., with seamless listen-through features).

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the wearable device 705 to perform various functions (e.g., functions or tasks supporting ASVN using a bone conduction sensor).

The code 735 may include instructions to implement aspects of the present disclosure, including instructions to support signal processing. In some cases, aspects of the signal processing manager 710, the I/O controller 715, and/or the transceiver 720 may be implemented by portions of the code 735 executed by the processor 740 or another device. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
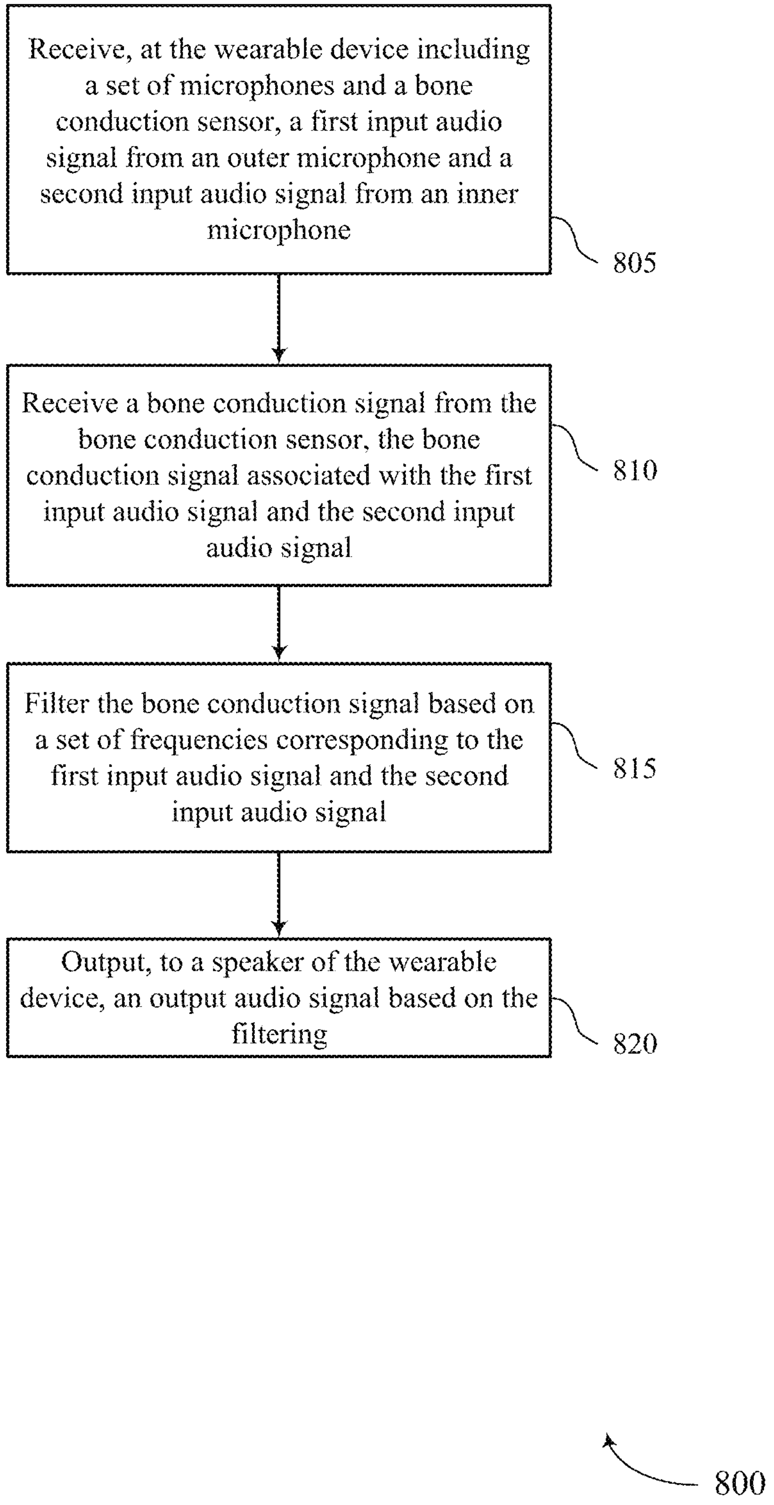
FIGS. 8 through 10 show flowcharts illustrating methods that support ASVN using a bone conduction sensor in accordance with aspects of the present disclosure.

FIG. 8 shows a flowchart illustrating a method 800 that supports ASVN using a bone conduction sensor in accordance with aspects of the present disclosure. The operations of method 800 may be implemented by a wearable device or its components as described herein. For example, the operations of method 800 may be performed by a signal processing manager as described with reference to FIGS. 4 through 7. In some examples, a wearable device may execute a set of instructions to control the functional elements of the wearable device to perform the functions described below. Additionally, or alternatively, a wearable device may perform aspects of the functions described below using special-purpose hardware.

At 805, the wearable device may receive, at the wearable device including a set of microphones and a bone conduction sensor, a first input audio signal from an outer microphone and a second input audio signal from an inner microphone. The operations of 805 may be performed according to the methods described herein. In some examples, aspects of the operations of 805 may be performed by a microphone manager as described with reference to FIGS. 4 through 7.

At 810, the wearable device may receive a bone conduction signal from the bone conduction sensor, the bone conduction signal associated with the first input audio signal and the second input audio signal. The operations of 810 may be performed according to the methods described herein. In some examples, aspects of the operations of 810 may be performed by a beamforming manager as described with reference to FIGS. 4 through 7.

At 815, the wearable device may filter the bone conduction signal based on a set of frequencies corresponding to the first input audio signal and the second input audio signal. The operations of 815 may be performed according to the methods described herein. In some examples, aspects of the operations of 815 may be performed by a signal isolation manager as described with reference to FIGS. 4 through 7.

At 820, the wearable device may output, to a speaker of the wearable device, an output audio signal based on the filtering. The operations of 820 may be performed according to the methods described herein. In some examples, aspects of the operations of 820 may be performed by a filtering manager as described with reference to FIGS. 4 through 7.

Figure 9:
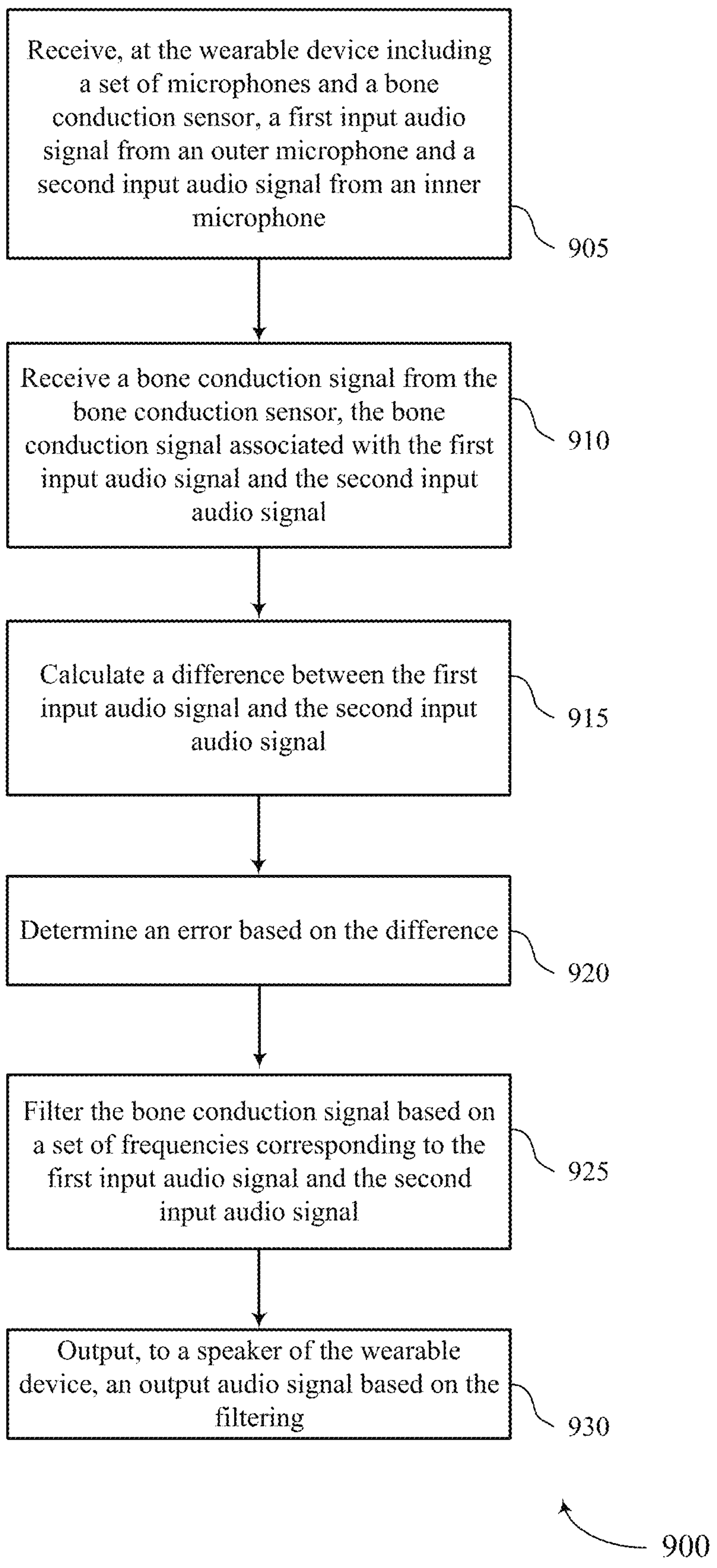

FIG. 9 shows a flowchart illustrating a method 900 that supports ASVN using a bone conduction sensor in accordance with aspects of the present disclosure. The operations of method 900 may be implemented by a wearable device or its components as described herein. For example, the operations of method 900 may be performed by a signal processing manager as described with reference to FIGS. 4 through 7. In some examples, a wearable device may execute a set of instructions to control the functional elements of the wearable device to perform the functions described below. Additionally, or alternatively, a wearable device may perform aspects of the functions described below using special-purpose hardware.

At 905, the wearable device may receive, at the wearable device including a set of microphones and a bone conduction sensor, a first input audio signal from an outer microphone and a second input audio signal from an inner microphone. The operations of 905 may be performed according to the methods described herein. In some examples, aspects of the operations of 905 may be performed by a microphone manager as described with reference to FIGS. 4 through 7.

At 910, the wearable device may receive a bone conduction signal from the bone conduction sensor, the bone conduction signal associated with the first input audio signal and the second input audio signal. The operations of 910 may be performed according to the methods described herein. In some examples, aspects of the operations of 910 may be performed by a beamforming manager as described with reference to FIGS. 4 through 7.

At 915, the wearable device may calculate a difference between the first input audio signal and the second input audio signal. The operations of 915 may be performed according to the methods described herein. In some examples, aspects of the operations of 915 may be performed by an audio zoom manager as described with reference to FIGS. 4 through 7.

At 920, the wearable device may determine an error based on the difference. The operations of 920 may be performed according to the methods described herein. In some examples, aspects of the operations of 920 may be performed by a signal isolation manager as described with reference to FIGS. 4 through 7.

At 925, the wearable device may filter the bone conduction signal based on a set of frequencies corresponding to the first input audio signal and the second input audio signal.

The operations of 925 may be performed according to the methods described herein. In some examples, aspects of the operations of 925 may be performed by an audio zoom manager as described with reference to FIGS. 4 through 7.

At 930, the wearable device may output, to a speaker of the wearable device, an output audio signal based on the filtering. The operations of 930 may be performed according to the methods described herein. In some examples, aspects of the operations of 930 may be performed by a filtering manager as described with reference to FIGS. 4 through 7.

Figure 10:
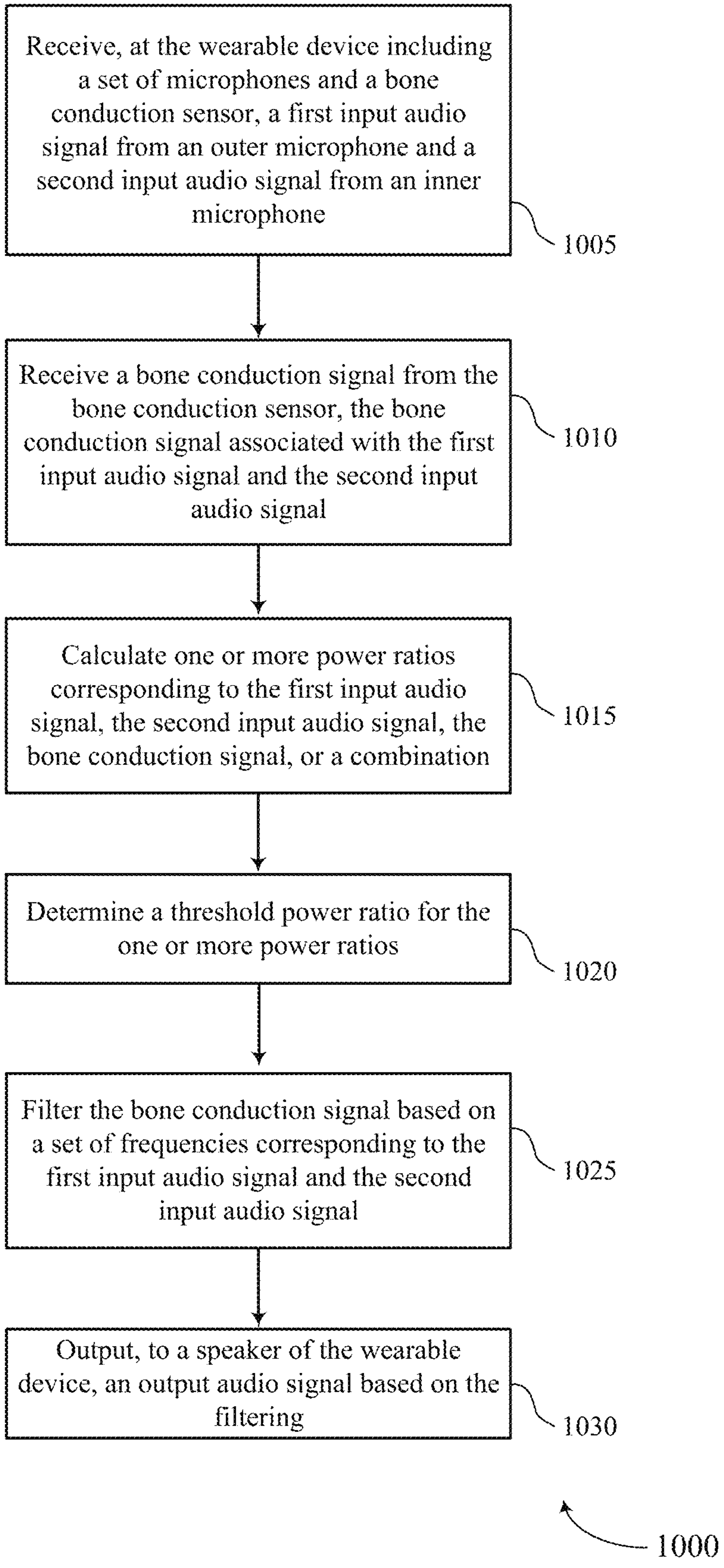

FIG. 10 shows a flowchart illustrating a method 1000 that supports ASVN using a bone conduction sensor in accordance with aspects of the present disclosure. The operations of method 1000 may be implemented by a wearable device or its components as described herein. For example, the operations of method 1000 may be performed by a signal processing manager as described with reference to FIGS. 4 through 7. In some examples, a wearable device may execute a set of instructions to control the functional elements of the wearable device to perform the functions described below. Additionally, or alternatively, a wearable device may perform aspects of the functions described below using special-purpose hardware.

At 1005, the wearable device may receive, at the wearable device including a set of microphones and a bone conduction sensor, a first input audio signal from an outer microphone and a second input audio signal from an inner microphone. The operations of 1005 may be performed according to the methods described herein. In some examples, aspects of the operations of 1005 may be performed by a microphone manager as described with reference to FIGS. 4 through 7.

At 1010, the wearable device may receive a bone conduction signal from the bone conduction sensor, the bone conduction signal associated with the first input audio signal and the second input audio signal. The operations of 1010 may be performed according to the methods described herein. In some examples, aspects of the operations of 1010 may be performed by a beamforming manager as described with reference to FIGS. 4 through 7.

At 1015, the wearable device may calculate one or more power ratios corresponding to the first input audio signal, the second input audio signal, the bone conduction signal, or a combination. The operations of 1015 may be performed according to the methods described herein. In some examples, aspects of the operations of 1015 may be performed by an audio zoom manager as described with reference to FIGS. 4 through 7.

At 1020, the wearable device may determine a threshold power ratio for the one or more power ratios. The operations of 1020 may be performed according to the methods described herein. In some examples, aspects of the operations of 1020 may be performed by a signal isolation manager as described with reference to FIGS. 4 through 7.

At 1025, the wearable device may filter the bone conduction signal based on a set of frequencies corresponding to the first input audio signal and the second input audio signal. The operations of 1025 may be performed according to the methods described herein. In some examples, aspects of the operations of 1025 may be performed by an audio zoom manager as described with reference to FIGS. 4 through 7.

At 1030, the wearable device may output, to a speaker of the wearable device, an output audio signal based on the filtering. The operations of 1030 may be performed according to the methods described herein. In some examples, aspects of the operations of 1030 may be performed by a filtering manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Techniques described herein may be used for various signal processing systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1λ, 1λ, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The signal processing systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein

What is claimed is:

1. A method for audio signal processing at a wearable device, comprising:

receiving, at the wearable device comprising a plurality of microphones and a bone conduction sensor, a first input audio signal from an outer microphone and a second input audio signal from an inner microphone;

receiving a bone conduction signal from the bone conduction sensor, the bone conduction signal associated with the first input audio signal and the second input audio signal;

determining a difference between the first input audio signal from the outer microphone and the second input audio signal from the inner microphone; and updating a signal from the bone conduction sensor by filtering the signal from the bone conduction sensor to generate a filtered bone conduction signal based at least in part on the determined difference.

2. The method of claim 1, further comprising:

outputting, to a speaker of the wearable device, an output audio signal based at least in part on the updated signal from the bone conduction sensor.

3. The method of claim 1, wherein updating the signal from the bone conduction sensor based at least in part on the determined difference comprises:

determining an error associated with the bone conduction signal from the bone conduction sensor based at least in part on the determined difference between the first input audio signal and the second input audio signal; and updating the signal from the bone conduction sensor based at least in part on the determined error.

4. The method of claim 1, wherein the difference between the first input audio signal and the second input audio signal includes at least one of an inter-channel phase difference or an intensity difference between the first input audio signal and the second input audio signal.

5. The method of claim 1, further comprising:

filtering the updated signal from the bone conduction sensor to generate the filtered bone conduction signal based at least in part on a set of frequencies corresponding to the first input audio signal and the second input audio signal.

6. The method of claim 1, further comprising:

adding a gain to the filtered bone conduction signal to equalize the filtered bone conduction signal.

7. The method of claim 6, further comprising:

updating the gain based on filtering the updated input to signal from the bone conduction sensor.

8. The method of claim 1, further comprising:

outputting, to a speaker of the wearable device, an output audio signal based at least in part on the filtered bone conduction signal.

9. The method of claim 1, further comprising:

performing an active self-voice naturalization procedure based at least in part on the filtered bone conduction signal.

10. The method of claim 1, further comprising:

adding a gain to the first input audio signal to equalize the first input audio signal.

11. The method of claim 1, further comprising:

detecting a presence of self-voice in the first input audio signal.

12. An apparatus for audio signal processing at a wearable device, comprising:

a processor;

memory in electronic communication with the processor; and instructions stored in the memory and executable by the processor to cause the apparatus to:

receive, at the wearable device comprising a plurality of microphones and a bone conduction sensor, a first input audio signal from an outer microphone and a second input audio signal from an inner microphone;

receive a bone conduction signal from the bone conduction sensor, the bone conduction signal associated with the first input audio signal and the second input audio signal;

determine a difference between the first input audio signal from the outer microphone and the second input audio signal from the inner microphone; and update a signal from the bone conduction sensor by filtering the signal from the bone conduction sensor to generate a filtered bone conduction signal based at least in part on the determined difference.

13. The apparatus of claim 12, wherein the instructions are further executable by the processor to cause the apparatus to:

output, to a speaker of the wearable device, an output audio signal based at least in part on the updated signal from the bone conduction sensor.

14. The apparatus of claim 12, wherein, to update the signal from the bone conduction sensor based at least in part on the determined difference, the instructions are further executable by the processor to cause the apparatus to:

determine an error associated with the bone conduction signal from the bone conduction sensor based at least in part on the determined difference between the first input audio signal and the second input audio signal; and update the signal from the bone conduction sensor based at least in part on the determined error.

15. The apparatus of claim 12, wherein the difference between the first input audio signal and the second input audio signal includes at least one of an inter-channel phase difference or an intensity difference between the first input audio signal and the second input audio signal.

16. The apparatus of claim 12, wherein the instructions are further executable by the processor to cause the apparatus to:

filter the updated signal from the bone conduction sensor to generate the filtered bone conduction signal based at least in part on a set of frequencies corresponding to the first input audio signal and the second input audio signal.

17. The apparatus of claim 12, wherein the instructions are further executable by the processor to cause the apparatus to:

add a gain to the filtered bone conduction signal to equalize the filtered bone conduction signal.

18. The apparatus of claim 17, wherein the instructions are further executable by the processor to cause the apparatus to:

update the gain based on filtering the updated signal from the bone conduction sensor.

19. The apparatus of claim 12, wherein the instructions are further executable by the processor to cause the apparatus to:

output, to a speaker of the wearable device, an output audio signal based at least in part on the filtered bone conduction signal.

20. The apparatus of claim 12, wherein the instructions are further executable by the processor to cause the apparatus to:

perform an active self-voice naturalization procedure based at least in part on the filtered bone conduction signal.

21. The apparatus of claim 12, wherein the instructions are further executable by the processor to cause the apparatus to:

add a gain to the first input audio signal to equalize the first input audio signal.

22. The apparatus of claim 12, wherein the instructions are further executable by the processor to cause the apparatus to:

detect a presence of self-voice in the first input audio signal.

* * * * *